Feb. 4, 1969

S. C. LEVY 3,425,872

THERMAL BATTERY HAVING HEAT GENERATING MEANS COMPRISING EXOTHERMICALLY ALLOYABLE METALS

Filed Sept. 22, 1965

Samuel C. Levy
INVENTOR.

BY

ATTORNEY

# United States Patent Office 3,425,872
Patented Feb. 4, 1969

3,425,872
THERMAL BATTERY HAVING HEAT GENERATING MEANS COMPRISING EXOTHERMICALLY ALLOYABLE METALS
Samuel C. Levy, Albuquerque, N. Mex., assignor, by mesne assignments, to the United States of America as represented by the United States Atomic Energy Commission
Filed Sept. 22, 1965, Ser. No. 489,441
U.S. Cl. 136—83
Int. Cl. H01m 21/14
6 Claims

ABSTRACT OF THE DISCLOSURE

A self-activating thermal battery including electrical terminals forming a casing means, a normally solid electrolyte means within said casing means and a thermally actuable heat generating means adjacent said electrolyte means including first and second exothermically alloyable metals for melting the electrolyte means and energizing the battery.

---

Figure 1:
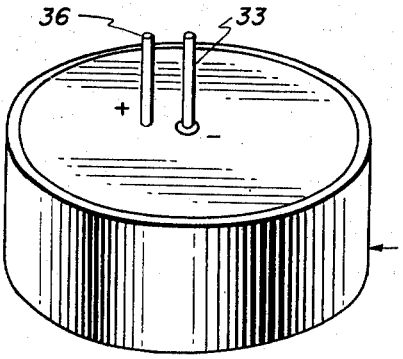

The invention described herein was made in the course of, or under, a contract with the U.S. Atomic Energy Commission.

There is a need for a device which may discharge an electrical impulse or current at a predetermined temperature threshold. For example, the sensing of fire, the overheating of components caused by friction or the proximity to a hot object, or the heating of a re-entry vehicle in the atmosphere, could be signaled by such a device.

While thermal batteries are known in the art, none of them are satisfactory as self-actuating batteries. They are not designed to activate at a temperature threshold, but rather at a signal which fires a pyrotechnic mixture. An impulse or an actuating signal initiates the heat generating means which in turn melts the electrolyte and causes the E.M.F. to be generated. This, of course, requires a separate circuit or system, which increases the cost, the complexity, and the chance for a malfunction in the battery. Known thermal batteries may activate upon absorption of thermal energy from an exterior source, but the thermal energy must be sufficient to melt the electrolyte. Tests have shown that at slow heating rates the heat generating means in most prior art thermal batteries become desensitized. Thus, while known batteries might autoinitiate providing the temperature is raised high enough in a short period of time, such a high temperature would defeat the purposes of a self-actuating battery. The present invention provides a thermal battery which will initiate at a predetermined temperature regardless of the heating price.

There are known solid electrolytes which will melt at low temperatures and thereupon become conductive, but at their melting temperatures their output is very low due to high internal resistance and other causes. Over a limited temperature range above the melting point the conductance increases almost linearly with temperature, or approximately 1% per deg. C. (1.8° F.). To obtain the desired output, it is therefore necessary to obtain sufficient heat from the exothermal reaction of the heat generating means to raise the temperature of the electrolyte to an optimum operating temperature range in a minimum amount of time. The present invention provides a new autoactivating thermal battery whose heat generating means is capable, upon activation, of raising the temperature of the electrolyte to the optimum range.

It is an object of the present invention to provide a new self-activating thermal battery.

It is another object of this invention to provide an autoactivated thermal battery of variable output.

It is another object of this invention to provide an autoactivated thermal battery having a variable activation temperature.

It is another object of this invention to provide a self-activating thermal battery of compact design.

It is another object of this invention to provide a thermal battery that will autoactivate at a predetermined threshold temperature regardless of the heating rate.

This specification, including the description, claims, and drawing, has been prepared in accordance with the applicable patent laws and the rules promulgated under the authority thereof.

Figure 2:
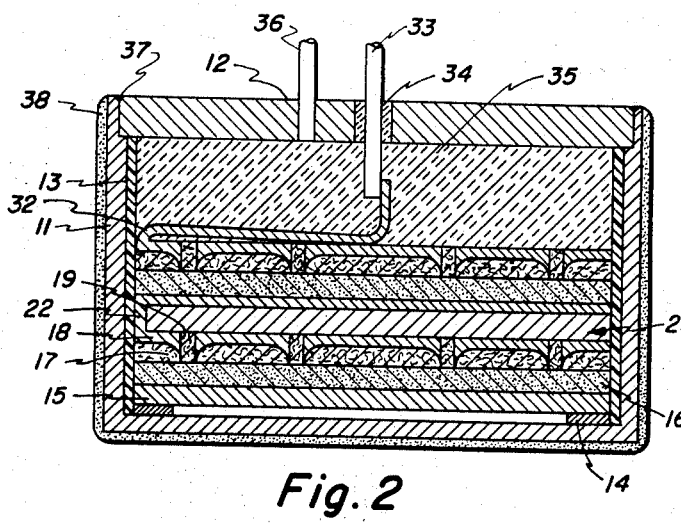
Figure 3:
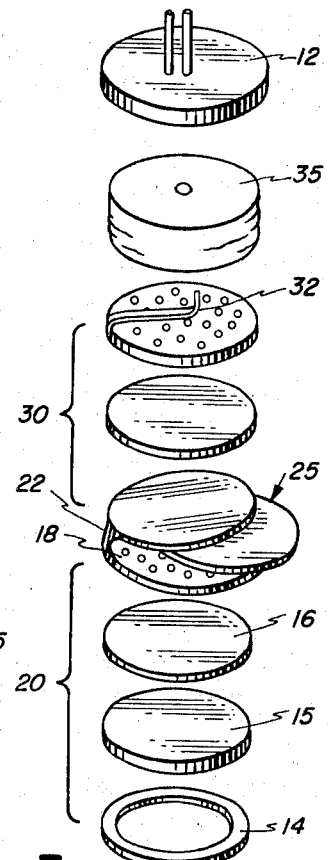
Figure 4A:
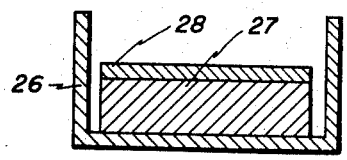
Figure 4B:
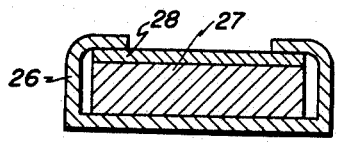
Figure 4C:
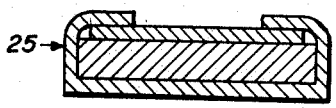

FIG. 1 is a view of the assembled thermal battery;
FIG. 2 is a sectional view of the battery;
FIG. 3 is an exploded view of the device; and
FIGS. 4a, 4b, and 4c are sectional views of the heat generating pellet.

As shown, the autoactivated thermal battery 10 comprises a case 11 and a header 12, both of which may be of any suitable material, such as 302 stainless steel, two electrolyte cells, 20 and 30, and a heat generating pellet 25 sandwiched between them. Depending on the particular environment and other requirements, any material that can be hermetically sealed may be used for the case and header. In the embodiment illustrated, the case and header become part of the cathode. A suitable electrical insulation 13, which may be "Teflon," insulates interior cells from the case 11. A washer 14, thermally insulates the bottom cell to help prevent heat transfer out from the cell. The washer is of a conductive material, such as nickel, which makes contact between the case and the nickel cathode 15. Above the cathode is a depolarizer-electrolyte-binder (DEB) pellet 16. The depolarizer, silver chromate, the electrolyte, a lithium chloride-potassium chloride eutectic, and the binder, which may be Linde Molecular Sieve Type 13X, may be prefused and homogeneously mixed as a powder after vacuum drying. It has been found that if the eutectic electrolyte is prefused, that is, raised to, or slightly above, its melting point briefly, and then allowed to cool, more efficient output results upon activation of the battery. One gram of the mixture may be pressed into a pellet under about 30 tons pressure.

Any suitable thermal battery chemical system could be used in place of the system herein described. As is known in the thermal battery art, the solid electrolyte is nonconductive, but upon melting becomes conductive. The depolarizer, which is mixed with the eutectic electrolyte, is actually the active cathode of the cell in that it enters the oxidation-reduction process with the anode. The nickel cathode is the cathode collector, or the place where the electrons gather. The function of the binder is to prevent or minimize deformation of the pellet after the electrolyte has melted. The pellet may be placed between a nickel cathode 15 and a calcium anode 17 to form a cell 20. The pure calcium used as the anode is very reactive and cannot be welded and therefore a grid 18, which may be nickel, is desirable as an electrical contact. The grid is perforated as at 19 and the calcium is pressed onto the grater side of the grid. If desired, calcium may be vapor deposited on a suitable metal to form a calcium bi-metal Between identical cells 20 and 30 is a heat generating pellet 25, shown in exaggerated detail in FIGS. 4a, 4b, and 4c. The heat generating pellet may comprise a cup-shaped base portion 26, about .005" thick, and 1.25" in diameter of a solder comprising about 60% tin and 40% lead, and a lithium disk 27, about .035" thick by 1.1875" diameter, which may be placed into the cup-shaped base portion 26, as shown in FIG. 4b, and may be secured in the cup by a solder disk or cap 28. The edges of the cup are crimped and pressed over the cap, and as a result of applied pressure, the lithium flows to fill the cup and a relatively uniform pellet about 1.25" in diameter is formed as shown in FIG. 4c. The lithium should be sealed in the pellet to prevent atmospheric oxidation and contact with moisture.

The lithium-solder combination was chosen because the metals comprising the combination have substantially the same melting point, thus rendering the rate of heating immaterial. When the threshold temperature is reached, the exothermal alloying takes place, liberating sufficient heat to cause the desired output from the prefused electrolyte.

The cells are shown in FIG. 2 connected together in series by a strap 22 from the nickel grid-calcium anode of cell 20 to the nickel cathode of the cell 30. The nickel grid-calcium anode of cell 30 may be connected by a strap 32 to the negative terminal 33 which extends through the header 12 and is electrically insulated therefrom and fixedly held in place by a suitable glass or ceramic seal 34. The strap 32 may be connected to the terminal by any appropriate manner, such as spot welding.

The cells are held firmly in place inside the case by suitable, non-conductive insulation 35. It is understood that the amount of insulation and the thermal requirements of the insulation, as well as the physical size of the case may vary according to the specific requirements of the battery.

The positive terminal 36 may be secured to the header 12, which may be fastened to the case 11 by heliarc welding as at 37. Thus the terminal 36 is electrically connected to the nickel cathode through the header 12, the case 11, and the washer 14.

A coating 38 of aluminum oxide, about .010" thick, may be placed on the outside of the case to electrically insulate the battery. If desired, the battery could be insulated on the inside, in which case an insulated lead would connect the nickel cathode to the positive terminal.

The heat generating pellet may be sandwiched between two cells and placed in the case which may be hermetically sealed to prevent moisture from entering. The electrical output of the battery may be altered by varying the number of cells and heat generating pellets in the battery. Similarly, the temperature of activation, which is about 370° F. for the pellet described, may be altered somewhat by varying the location of the pellets in the battery and by the use or absence of thermal insulation in or around the battery case.

In operation, the autoactivating thermal battery may be assembled as described and placed in its use environment, with the terminals connected to the desired circuit. As the self-actuating battery is subjected to heat, the internal temperature of the battery rises until the melting point of the pellet, about 370° F., is reached. As the lithium exothermally alloys with the lead and tin solder, about 230 calories per gram of material is released. This heat changes the DEB pellet from its stable, non-electrolyte solid form to its liquid electrolyte form and allows the battery to deliver electrical power.

In tests varying the rate of heating, the battery described has performed as indicated in the table below. The same battery configuration and the same container configuration were used throughout the tests, but two heating rates were used. The heating rates were considered to be the minimum and maximum rates expected for the use application for which the battery was designed. The activating temperature at the container is the temperature at a specific location on or in the container or use environment of the battery.

| Heating rate (° F./sec.) | Container temp. at activation (° F.) | Rise time to 1.0 v. (sec.) | Peak volts | Peak current (amps) |
| --- | --- | --- | --- | --- |
| 0.5 | 379 | 0.45 | 2.25 | 22.5 |
| 0.5 | 387 | 0.60 | 1.95 | 19.5 |
| 0.5 | 379 | 0.40 | 1.70 | 17.0 |
| 0.5 | 385 | 1.00 | 2.10 | 21.0 |
| 3.5 | 556 | 0.95 | 2.05 | 20.5 |
| 3.5 | 525 | 0.50 | 2.40 | 24.0 |
| 3.5 | 550 | 0.55 | 2.60 | 26.0 |
| 3.5 | 543 | 0.50 | 2.35 | 23.5 |

The electrolyte has an optimum operating range, as stated above, which is at least about 180° F. above its melting point, or about 850° F. The heat generating pellet exotherms at about 370° F., and gives off about 230 cal./gram at temperatures in excess of 1800° F. It can therefore readily be seen that the high thermal energy pulse given off is able to adequately raise the temperature of the electrolyte to the optimum range in a minimum amount of time. When the battery casing and its heat generating pellet have been subjected to an external heat source such that the temperature of the pellet is raised to its melting point, it will be seen that the described reaction takes place. The rate at which the thermal energy is absorbed will not affect the battery itself, but will affect the container or use environment of the battery due to the temperature gradient between the two, as illustrated in the above table.

It will therefore be seen that the present invention provides a new and improved thermal battery that is auto-activating, compact, and, by slight changes in insulation, placement, and number or component cells, may have its activation temperature and output varied.

I claim:

1. A self-activating thermal battery comprising the combination of casing means including a pair of electrical terminals, a normally solid electrolyte means within said casing, and thermally actuable heat generating means within the casing adjacent the electrolyte means including in contact with each other first and second exothermically alloyable metals having melting points similar to each other and below that of said electrolyte means for melting the electrolyte means upon subjection of the exterior of the casing and its contained heat generating means to and absorption from an externally disposed thermal energy source having not less than a predetermined temperature.

2. The combination of claim 1 in which the heat generating means is sandwiched between electrolyte cells.

3. The combination of claim 1 in which said first metal of the heat generating means comprises lead-tin solder and said second metal comprises lithium.

4. The combination of claim 1 in which said first and second metals of the heat generating means comprises a lead-tin solder mixture having a recessed portion containing a lithium pellet and additional lead-tin solder means providing a covering for said recessed portion and pellet whereby the pellet is substantially sealed in the lead-tin solder.

5. The combination of claim 3 in which said lead-tin solder is in the proportions of about 60% tin and 40% lead.

6. The combination of claim 4 in which said lead-tin is in the proportions of about 60% tin and 40% lead.

(References on following page)

References Cited

UNITED STATES PATENTS

| | | | |
|---|---|---|---|
| 856,162 | 6/1907 | Kitsee | 136—83 |
| 2,081,926 | 6/1937 | Gyuris | 136—83 |
| 2,928,890 | 3/1960 | Van Der Grinten et al. | 136—83 |
| 3,055,960 | 9/1962 | Yalom et al. | 136—83 XR |
| 3,079,454 | 2/1963 | McGinnis | 136—225 |
| 3,311,503 | 3/1967 | Zellhoefer | 136—83 |

JOHN H. MACK, *Primary Examiner.*

A. SKAPARS, *Assistant Examiner.*